US008734645B2

(12) United States Patent
Heiss

(10) Patent No.: US 8,734,645 B2
(45) Date of Patent: May 27, 2014

(54) MEDIA-FREE SYSTEM FOR THE PRODUCTION OF HIGH PURITY WATER AND METHODS OF USE

(76) Inventor: Christopher Heiss, Colorado Springs, CO (US)

( * ) Notice: Subject to any disclaimer, the term of this patent is extended or adjusted under 35 U.S.C. 154(b) by 1048 days.

(21) Appl. No.: 12/168,886

(22) Filed: Jul. 7, 2008

(65) Prior Publication Data

US 2009/0095666 A1  Apr. 16, 2009

Related U.S. Application Data

(60) Provisional application No. 60/948,293, filed on Jul. 6, 2007.

(51) Int. Cl.
*B01D 29/00* (2006.01)
*C02F 9/00* (2006.01)

(52) U.S. Cl.
CPC .. *B01D 29/00* (2013.01); *C02F 9/00* (2013.01)
USPC ............. 210/252; 210/85; 210/106; 210/138; 210/143; 210/188; 210/295; 210/259; 210/806; 210/321.69; 210/739

(58) Field of Classification Search
CPC ....... B03C 2201/02; B03C 5/02; C02F 1/001; C02F 1/444; C02F 1/463
See application file for complete search history.

(56) References Cited

U.S. PATENT DOCUMENTS

| | | | |
|---|---|---|---|
| 3,766,050 A * | 10/1973 | Pados | ............................ 204/600 |
| 4,169,789 A | 10/1979 | Lerat | |
| 4,273,660 A | 6/1981 | Beitzel | |
| 4,349,431 A | 9/1982 | Axenko et al. | |
| 4,361,485 A | 11/1982 | Boonstra | |
| 4,391,712 A | 7/1983 | Tyler et al. | |
| 4,548,716 A * | 10/1985 | Boeve | ........................... 210/652 |
| 4,680,109 A | 7/1987 | Yamada et al. | |
| 4,702,842 A | 10/1987 | Lapierre | |
| 4,772,385 A | 9/1988 | Yamada et al. | |
| 4,872,959 A | 10/1989 | Herbst et al. | |
| 5,059,317 A | 10/1991 | Marius et al. | |
| 5,236,595 A | 8/1993 | Wang et al. | |
| 5,244,579 A | 9/1993 | Horner et al. | |
| 5,256,299 A | 10/1993 | Wang et al. | |
| 5,259,972 A | 11/1993 | Miyamaru et al. | |

(Continued)

OTHER PUBLICATIONS

W. Dickinson Burrows and Sara E. Renner, MCHB-TS-EWS (40) Medical Issues Information Paper No. IP31-017, "Biological Warfare Agents as Potable Water Threats," Water Supply Management Program, U.S. Army Center for Health Promotion and Preventive Medicine, Oct. 1998, pp. 1-44.

(Continued)

*Primary Examiner* — Dirk Bass
(74) *Attorney, Agent, or Firm* — Marsh Fischmann & Breyfogle LLP

(57) ABSTRACT

A system for producing high purity water, and particularly for the production of water that is suitable for injection, as well as method of using the same, are disclosed. The system includes a unique combination of known water purification methods that is particularly well-suited to the production USP purified water and USP water that is suitable for injection. The system minimizes potential for organism growth within the system by providing multiple means of organism destruction and removal and by not utilizing any standard water treatment media.

16 Claims, 1 Drawing Sheet

(56) References Cited

U.S. PATENT DOCUMENTS

| | | | |
|---|---|---|---|
| 5,266,202 A | 11/1993 | Okonogi et al. | |
| 5,272,091 A | 12/1993 | Egozy et al. | |
| 5,385,653 A | 1/1995 | Tamarkin | |
| 5,385,664 A | 1/1995 | Oinuma et al. | |
| 5,422,013 A | 6/1995 | Hirofuji | |
| 5,494,573 A | 2/1996 | Schoenmeyr et al. | |
| 5,496,466 A | 3/1996 | Gray | |
| 5,501,798 A | 3/1996 | Al-Samad et al. | |
| 5,547,584 A | 8/1996 | Capehart | |
| 5,573,662 A | 11/1996 | Abe et al. | |
| 5,587,057 A | 12/1996 | Metzler et al. | |
| 5,589,066 A | 12/1996 | Gray | |
| 5,611,907 A | 3/1997 | Herbst et al. | |
| 5,647,973 A | 7/1997 | Desaulniers | |
| 5,725,758 A | 3/1998 | Chace et al. | |
| 5,741,416 A | 4/1998 | Tempest, Jr. | |
| 5,788,858 A | 8/1998 | Acernese et al. | |
| 5,833,846 A * | 11/1998 | Tanabe et al. | 210/202 |
| 5,897,780 A | 4/1999 | Grabowski et al. | |
| 5,911,884 A * | 6/1999 | Boulter | 210/739 |
| 5,972,216 A | 10/1999 | Acernese et al. | |
| 6,074,551 A | 6/2000 | Jones et al. | |
| 6,077,435 A | 6/2000 | Beck et al. | |
| 6,090,294 A | 7/2000 | Teran et al. | |
| 6,217,773 B1 | 4/2001 | Graham | |
| 6,328,896 B1 | 12/2001 | Atnoor et al. | |
| 6,398,965 B1 | 6/2002 | Arba et al. | |
| 6,402,954 B1 | 6/2002 | O'Keefe, Jr. | |
| 6,475,371 B1 | 11/2002 | Shirahata et al. | |
| 6,488,835 B1 | 12/2002 | Powell | |
| 6,537,456 B2 | 3/2003 | Mukhopadhyay | |
| 6,607,668 B2 * | 8/2003 | Rela | 210/321.6 |
| 6,613,201 B1 | 9/2003 | Hecking | |
| 6,613,202 B2 | 9/2003 | Herbst et al. | |
| 6,613,217 B1 | 9/2003 | Gilmore | |
| 6,651,383 B2 | 11/2003 | Grott | |
| 6,663,783 B2 | 12/2003 | Stephenson et al. | |
| 6,673,321 B2 | 1/2004 | Weakly et al. | |
| 6,679,988 B2 | 1/2004 | Gsell | |
| 6,689,271 B2 | 2/2004 | Morkovsky et al. | |
| 6,746,593 B2 | 6/2004 | Herbst | |
| 6,780,292 B2 | 8/2004 | Hermann et al. | |
| 6,783,687 B2 | 8/2004 | Richard | |
| 6,796,436 B2 * | 9/2004 | Carson et al. | 210/501 |
| 6,797,179 B2 | 9/2004 | Arnaud | |
| 6,800,206 B2 | 10/2004 | Robinson | |
| 6,849,178 B2 | 2/2005 | Hecking | |
| 6,866,757 B2 | 3/2005 | Gilmore | |
| 6,908,546 B2 | 6/2005 | Smith | |
| 6,936,172 B2 | 8/2005 | Hebert | |
| 6,972,077 B2 | 12/2005 | Tipton et al. | |
| 2004/0007452 A1 | 1/2004 | Warren et al. | |
| 2004/0188352 A1 * | 9/2004 | Dey et al. | 210/652 |
| 2005/0087484 A1 | 4/2005 | Lambie | |
| 2005/0121388 A1 | 6/2005 | Wood et al. | |
| 2005/0139530 A1 | 6/2005 | Heiss | |
| 2005/0230312 A1 | 10/2005 | Chancellor | |
| 2006/0060532 A1 | 3/2006 | Davis | |
| 2006/0091077 A1 * | 5/2006 | Haas et al. | 210/641 |
| 2008/0087603 A1 | 4/2008 | Heiss | |

OTHER PUBLICATIONS

Burrows, et al., MCHB-TS-EWS (40), Medical Issues Information Paper No. 31-018, "Biological Warfare Agents in Drinking Water: Guide for Field Personnel", Water Supply Management Program, U.S. Army Center for Health Promotion and Preventive Medicine, Oct. 1998, pp. 1-33.

Technical Bulletin "Sanitary Control and Surveillance of Field Water Supplies," TB MED 577, NAVMED P-5010-9, Appendix D, AFOSH Standard 48-7, Departments of the Army, Navy and Air Force, Washington, D.C., Feb. 1999, pp. 1-196.

W. Dickinson Burrows and Jerry A. Valcik, Water Quality Information Paper No. IP-31-014 "Water Purification by Reverse Osmosis," Water Supply Management Program, U.S. Army Center for Health Promotion and Preventive Medicine, Draft Feb. 11, 1999, pp. 1-8.

Lozier, et al., "Evaluation of Biological and Non-Biological Methods for Assessing Virus Removal by and integrity of High Pressure Membrane Systems", American Water Works Association Membrane Technology Conference, 2003, pp. 1-17.

* cited by examiner

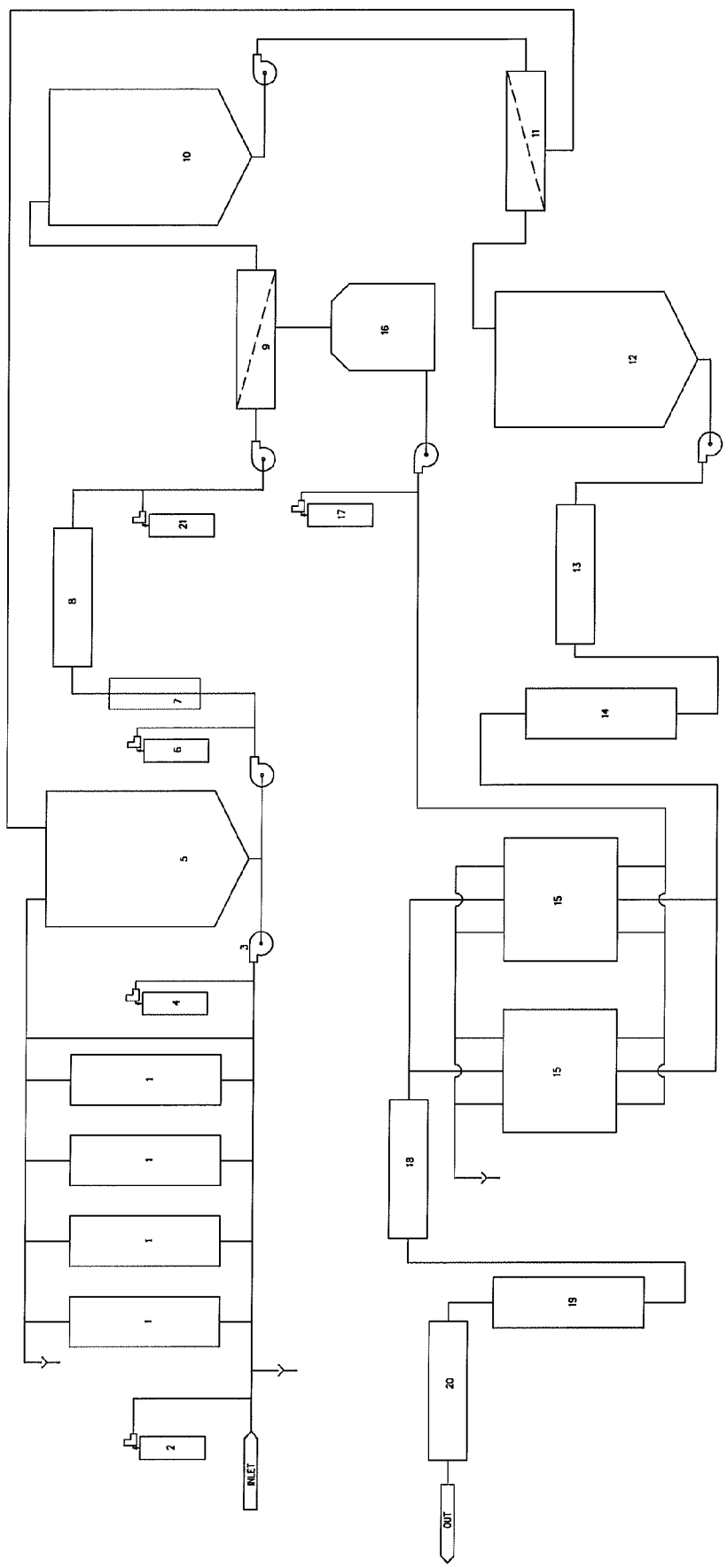

MEDIA-FREE SYSTEM FOR THE PRODUCTION OF HIGH PURITY WATER AND METHODS OF USE

CROSS-REFERENCE TO RELATED APPLICATIONS

This application claims the benefit of priority under 35 U.S.C. §119(e) from U.S. Provisional Application Ser. No. 60/948,293, filed Jul. 6, 2007, the contents of which are incorporated herein in their entirety by this reference.

FIELD OF THE INVENTION

This invention resides in the field of water purification, and specifically to a media-free system for the production of high purity water, and methods of using the same. More specifically, embodiments of the present invention are directed to a design with a unique combination of technologies for the preparation of high purity water which minimizes the potential for bacterial growth within the system. Further embodiments of the invention are directed to a system which is capable of utilizing a concentrate stream from a reverse osmosis unit as a feed stream for the concentrate chamber of an electrodeionization system.

BACKGROUND OF THE INVENTION

High purity water is required for many industrial applications including microelectronics manufacturing, all types of boiler feed, humidification, pharmaceutical manufacturing, and more. The United States Pharmacopeia ("USP") is the official public standards-setting authority for all prescription and over-the-counter medicines, dietary supplements, and other healthcare products manufactured and sold in the United States, though the USP's standards are also recognized and used in more than 130 countries world-wide. Those products and ingredients that pass all of the USP verification requirements may be marketed with the term "USP Verified" on them. For water, the USP has set production purity standards for two basic types of water: (1) purified water; and (2) water that is suitable for injection. In order to produce water that is suitable for injection, the water that is first fed into a USP water testing or purification system must already be deemed potable, or of sufficient quality to serve as drinking water, by complying with standards set for drinking water by one or more of the known standard setting bodies, such as the U.S. Environmental Protection Agency. This potable water is then treated further to meet the specifications set forth by the USP for USP Verified purified water and/or USP Verified water that is suitable for injection.

Historically, USP purified water systems have been of two types, those for the production of USP Verified purified water which typically consist of pretreatment, reverse osmosis and/or deionization subsystems, and those for USP Verified water this is suitable for injection systems which typically consist of pretreatment and distillation subsystems. Pretreatment, in either of these purification systems, typically consists of multimedia filtration, carbon filtration, and then water softening. The multimedia filtration portion of the pretreatment is usually a mixture of sand and anthracite, a high carbon count mineral coal, of varying particle sizes. The media resides in a cylindrical pressure vessel and water is treated in the multimedia filtration portion of pretreatment by passing it through the cylindrical pressure vessel under pressure. Periodically, the direction of the flow is reversed through the vessel to purge particulate matter that has accumulated in the media. Carbon filtration is applied in a similar manner with carbon granules loaded into a cylindrical pressure vessel. The carbon may be used to remove residual chlorine that is typically present in the drinking water that feeds into the USP water system. In a typical water softener, there are resin beads that are loaded into a vessel and water is passed through the vessel, in contact with the beads. In addition to periodic backwashing, these beads must be periodically regenerated by exposing them to concentrated salt water. In systems using standard deionization, there are resin beads in vessels that are regenerated with caustic and acid. In all of these treatments utilizing vessels filled with granules or beads (i.e., media), there is a strong possibility of organism growth in the vessels. This is due to the many existing sites within the media for organisms to lodge and grow and due to the low velocities of the water pushed through the vessels. In those vessels that utilize carbon, the carbon itself actually leads to organism growth by removing residual disinfectant from the water that would otherwise slow or prevent organism growth. Furthermore, the organic compounds removed from the water by the media provide a food source for organisms, thereby contributing to the overall level of organismal contamination.

Several procedures and systems have been developed to sanitize media filters. To date, the most successful of these systems have been those that utilize hot water sanitization, however these systems are quite expensive to construct and are typically accompanied by large energy costs. Another sanitizing system was designed by Heiss in 1999; this system was not patented, but has been in use continuously since 2000. This system includes the following steps in the following order: ultrafiltration, water softening, ultraviolet dechlorination, single pass reverse osmosis, ultraviolet treatment for the destruction of total organic carbon, membrane degasification, electrodeionization, and finally another step of ultrafiltration. U.S. Pat. No. 6,328,896 to Atnoor et al. describes the use of ultraviolet dechlorination in low doses in conjunction with a water softener. U.S. Pat. No. 6,398,965 to Arba et al. describes a method of using pH adjustment to modify chloramines in association with softening and electrodeionization. U.S. Pat. No. 6,679,988 to Gsell describes use of ultrafiltration and ultraviolet dechlorination with softener in advance of treatment with a still or reverse osmosis. U.S. Pat. No. 6,949,192 to Gsell is a continuation of U.S. Pat. No. 6,799,988 and contains the same disclosure.

All of the aforementioned systems that incorporate ultrafiltration and ultraviolet dechlorination also include the use of water softeners and/or media filtration. Water softeners are included in these systems for three principal reasons: to prevent scaling in reverse osmosis systems, to prevent scaling in electrodeionization systems, and/or to prevent scaling in high intensity ultraviolet lights. In each of these systems, organism growth and contamination is a common problem that must be overcome, often with great time and expense. The present inventors have traced the primary source of organism growth and contamination in these systems to the water softener or to the media filtration systems. Therefore, the use of a water softener in these systems provides a location for organismal contamination to occur.

SUMMARY OF THE INVENTION

The present invention eliminates the problems associated with known water purification systems by eliminating the use of media vessels during water purification. The lack of media vessels means that water purification can take place without pretreatment, and thus without the need to employ the steps of multimedia filtration, carbon filtration, and/or water softening. There are only a handful of treatment systems and processes presently utilized for water treatment in the water purification industry, all of which are known. Innovation in this industry therefore comes in the combination of these known systems and processes in new ways to achieve different or better results and for use in new or different applications. Accordingly, the present invention utilizes a unique combination of known technologies to produce high purity water and is relevant to any application that requires the production of high purity water, though embodiments of the present invention are particularly well suited to the requirements of the pharmaceutical industry, and particularly to the production of purified water that is suitable for injection. Embodiments of the present invention are thus capable of producing both of the two basic types of water regulated by the USP: (1) purified water; and (2) purified water that is suitable for injection.

The present invention eliminates the use of a water softener and the use of any other standard water treatment media in the treatment of water to produce purified water. The present inventors have discovered a system that produces the same, and often improved, results as a water softener, but without the presence of a water softening device. In some embodiments, water is subjected to two passes of reverse osmosis in order to remove minerals and therefore decrease the hardness of the water before it enters an electrodeionization system. In these embodiments, an acid is injected into an embodiments of the water purification system of the present invention upstream of a high intensity ultraviolet ("UV") light in order to acidify the water and prevent the scaling that can be caused by untreated water. Alternatively, a magnetic field may be used upstream of the UV light in order to alter the scaling characteristics of the water. Once treated by the UV light, the water proceeds through the system to a first pass of reverse osmosis, where the prior acidification of the water, used to prevent scaling in the UV light, also helps to prevent scaling in the reverse osmosis component. The reverse osmosis process removes minerals from the water, which may cause scaling within the reverse osmosis system. To prevent this, an antiscalant is added to the water after it has been treated with UV light and before it is passed through the first reverse osmosis treatment. The antiscalant is not added to the water in advance of UV light treatment as high intensity UV light has a tendency to break some of the bonds in the antiscalant chemical, rendering it less effective. The water resulting from the first pass of reverse osmosis is then again acidified, to prevent scaling, and then proceeds to a second pass of reverse osmosis. The water resulting from the second pass of reverse osmosis is then passed through an electrodeionization system. Water treated in this manner is equivalent to, and in many instances is an improvement to, water that has been treated by a water softener and/or by the use of any other standard water treatment media.

In the known systems that utilize water softeners or other standard media, the use of two passes of reverse osmosis prior to electrodeionization results in a water feed supply for the electrodeionization system that has a conductivity that is quite low. In these systems, the feed water to the electrodeionization system cannot simply be split to feed the concentrate and electrolyte inlets in the electrodeionization system as is common in many electrodeionization applications. Embodiments of the present invention utilize the first pass reverse osmosis concentrate, either alone or in combination with the second pass reverse osmosis concentrate, as a novel method of addressing this issue. The first pass reverse osmosis concentrate must be acidified to prevent scaling, however the relatively high conductivity of the first pass reverse osmosis concentrate enhances the flow of electrons in the electrodeionization system, thereby yielding a higher quality dilute flow from the electrodeionization system.

In accordance with further embodiments of the present invention, a water purification system is provided. The water purification system comprises a unique combination of components, the first component comprising a first ultrafiltration membrane barrier having at least one ultrafiltration membrane having a molecular weight cut off of from about 100,000 to about 150,000 and a pore size of about <0.15 microns. The water purification system is also equipped with a means of automatically backflushing the at least one ultrafiltration membrane on a periodic basis, the periodic basis comprising a period of time ranging from about 10 minutes to about 4 hours such that a single backflushing will occur at a desired time period after the water purification system is activated and then each successive backflushing will occur at the same time period. By way of example and not limitation, a first backflushing may take place 30 minutes after the water purification systems is activated, with each successive backflushing occurring at 30-minute intervals thereafter.

The water purification system is further equipped with a means of continuously injecting a sodium hypochlorite solution into the water before the water passes through the at least one ultrafiltration membrane and/or on a periodic basis during one, some or all of the backflushings. The water purification system further comprises a first high intensity UV light following the ultrafiltration treatment, the UV light provided by any suitable UV light source, such as a UV lamp, and being utilized at a wavelength ranging from about 185 nm to about 254 nm wavelength. The high intensity UV light is configured so that it provides a UV light dosage to the water as it passes by the UV light source that is adequate to destroy both free chlorine and chloramines by sizing at a minimum of 3 million microwatt seconds per square centimeter.

The water purification system further comprises a first pass of reverse osmosis after the high intensity UV light. The permeate from the first pass of reverse osmosis continues through the system. In an alternate embodiment, the water concentrate resulting from the first pass of reverse osmosis may optionally be accumulated in a reservoir and utilized as a concentrate stream in a downstream electrodeionization process, as described hereinbelow. The water purification system is further comprised of a second pass of reverse osmosis after the first pass of reverse osmosis. The concentrate stream is routed to join the feed of the first pass of reverse osmosis. The permeate from the second pass of reverse osmosis continues through the system. The water purification system further comprises a second high intensity UV light following the second pass of reverse osmosis, the UV light provided by a UV light source and being utilized at a wavelength ranging from about 185 nm to about 254 nm wavelength. The high intensity UV light is configured so that it provides a UV light dosage to the water as it passes by the UV light source that is adequate to destroy the total organic carbon by sizing at a minimum of 90,000 microwatt seconds per square centimeter.

The water purification system further comprises a membrane degasification treatment following the second UV light. The water purification system is further comprised of an electrodeionization treatment following the degasification treatment. The elecrodeionization modules utilized in the electrodeionization treatment having a dilute flow that passes through the resin containing chamber of the modules, a concentrate flow that receives the ions leaving the dilute flow, and an electrolyte flow that is the concentrate flow across the surface of the electrodes. The water from the membrane degasification treatment is routed to the dilute inlet on the electrodeionization modules. The water purification system is further comprised of a second ultrafiltration membrane barrier downstream of the electrodeionization treatment, the second ultrafiltration membrane barrier being of the same configuration as the first ultrafiltration membrane barrier, inclusive of the means for backflushing.

In some embodiments, the concentrate from the first pass of reverse osmosis may be accumulated and utilized for the feed to the concentrate and electrolyte inlets on the electrodeionization modules. In these embodiments, the accumulated first pass concentrate is pressurized and injected with an acid prior to entering the elecrodeionization modules. Alternatively, a portion of the water from the degasification treatment can be accumulated, pressurized, and injected with acid and/or sodium chloride and utilized to feed the concentrate and electrolyte inlets.

In some embodiments, the water purification system is equipped with a means of injecting acid into the water before the water enters either the first and/or the second high intensity UV light chamber to prevent scaling of the light transmitting surface of the UV light source. In further embodiments, the water purification system is equipped with a means of applying an electromagnetic field to the water before the water enters either the first and/or the second high intensity UV light chamber to prevent scaling of the light transmitting surface of the UV light source. In still further embodiments, the water purification system is equipped with a means of injecting sodium metabisulfite downstream of either the first and/or the second high intensity UV light chamber. In still further embodiments, the water purification system is equipped with a means of injecting an antiscalant downstream of either the first and/or the second high intensity UV light chamber. According to still further embodiments of the present invention, a third high intensity UV light is added prior to or following the second ultrafiltration membrane barrier, the third high intensity UV light being of the same configuration as the first and/or second high intensity UV light.

As a person having ordinary skill in the art will appreciate, the water purification system of the present invention passes water through the system, from component to component, by way of a series of pipes, channels, tubes, or similar means. These pipes, channels, tubes or similar means may be of any type that is suitable for the passage of water through a purification system and made of any suitable material that may be cleaned, sanitized and/or sterilized periodically with no loss of function in order to maintain the sterility of the system. Suitable materials include, without limitation, surgical steel, stainless steel, silicone, polyvinylchloride, latex, rubber, neoprene, fluoroelastomers such as Viton and Fluorel, nitrile, Hypalon, thermoplastic elastomers such as rubber, synthetic polyisoprene, polyurethane and similar materials.

Additional advantages of the present invention will become readily apparent from the following discussion, particularly when taken together with the accompanying drawing.

BRIEF DESCRIPTION OF THE DRAWING

FIG. 1 is a flowchart depiction of a water purification system according to at least some embodiments of the present invention.

The drawing is not necessarily to scale and may include exaggerated features forpurposes of clarity.

DETAILED DESCRIPTION OF THE INVENTION

Referring now to FIG. 1, a water purification system according to at least some embodiments of the present invention is provided. In the depicted embodiment, source water, or water to be purified, enters the system through an Inlet and then passes through a first ultrafiltration membrane ("UF") barrier, the first ultrafiltration membrane barrier comprising at least one ultrafiltration membrane 1, and preferably including a plurality of ultrafiltration membranes 1. The at least one ultrafiltration membrane 1 is, in some embodiments, a microfilter or an ultrafilter having a nominal pore size to be capable of removing bacteria and organic matter from the feed water. Source water passing through the Inlet is pumped from the Inlet to and through the ultrafiltration membrane barrier and thus to and through the at least one ultrafiltration membrane 1. The at least one ultrafiltration membrane 1 has a molecular weight cut off of from about 100,000 to about 150,000 and a pore size of about <0.15 microns, thereby only permitting particles smaller than the pore size to pass through the at least one membrane 1, while those particles that are larger than the pore size, or that have a molecular weight higher than the cut off are prevented from passing through the at least one membrane 1. Water leaving the first ultrafiltration membrane barrier, the ultrafiltration permeate, will thus be devoid of any particles that are incapable of passing through the at least one membrane 1.

The water purification system is also equipped with a means of automatically backflushing the first ultrafiltration membrane barrier on a periodic basis. The means of automatically backflushing the ultrafiltration membrane barrier comprises an accumulation tank 5 for the ultrafiltration permeate and a pump 3 that can drive the ultrafiltration permeate backward through the system and into and through the at least one membrane 1, thereby washing those particles that were too large to pass through the at least one membrane 1 away from the first ultrafiltration barrier and, ultimately, out of the system by way of the Inlet. The ultrafiltration permeate leaves the first ultrafiltration membrane barrier and moves toward the accumulation tank 5. The ultrafiltration permeate may then be completely diverted into the accumulation tank 5 so that all of the ultrafiltration permeate is reserved inside of the accumulation tank 5, or it may be partially diverted such that some of the ultrafiltration permeate is reserved inside of the accumulation tank 5 and the rest is allowed to continue through the water purification system. At a desired time interval, the pump 3 moves the ultrafiltration permeate from the accumulation tank 5 backward through the at least one ultrafiltration membrane 1, thereby washing the at least one membrane 1 and pushing the effluent away from the at least one membrane 1 and out of the system.

The water purification system is also equipped with a means of injecting a sodium hypochlorite solution on a continual basis into the source water before the source water is passed through the UF membranes. The means of injecting a sodium hypochlorite solution comprises a chemical injection system 2 that is configured to inject this solution constantly while the system is in operation and/or on a periodic basis during some or all of the backflushings by the chemical injection system 2.

The water purification system further comprises a first high intensity ultraviolet (UV) light 8, following the UF treatment. The UV light is provided by at least one UV light source and at a wavelength ranging from about 185 nm to about 254 nm. The wavelength of the UV light is sufficient to provide a dosage to the water adequate to destroy both free chlorine and chloramines by sizing at a minimum of 3 million microwatt seconds per square centimeter.

The water purification system is further comprised of a first pass of reverse osmosis system 9 after the first high intensity UV light. The water is passed from a component that houses the first UV light through the system and into the first reverse osmosis component, where it is subjected to reverse osmosis. Reverse osmosis is a separation process that uses pressure to force the water treated by the first UV light through a membrane in the reverse osmosis component that retains several dissolved solutes on one side and allows a purified solvent to pass to the other side. More formally, reverse osmosis is the process of forcing a solvent from a region of high solute concentration through a membrane to a region of low solute concentration by applying a pressure in excess of the osmotic pressure, in the reverse of the normal osmosis process, which is the natural movement of solvent from an area of low solute concentration, through a membrane, to an area of high solute concentration when no external pressure is applied. The membrane utilized is semipermeable, meaning it allows the passage of solvent but not of solute. The concentrate from the first pass of reverse osmosis may be wholly or partially accumulated in a reservoir 16 and utilized for the concentrate stream to the downstream electrodeionization process as described later, may continue to a storage tank 10, or may continue within the purification system.

The water purification system is further comprised of a second pass of reverse osmosis 11 after the first pass of reverse osmosis. The concentrate stream from the first pass of reverse osmosis is passed through the second pass reverse osmosis. In some embodiments, the concentrate generated by this second pass of reverse osmosis is routed to join the feed of the first pass of reverse osmosis. In alternate embodiments, the permeate from the second pass of reverse osmosis continues to a storage tank 12.

The water purification system is further comprised of a second high intensity UV light 13 following the second pass of reverse osmosis. The UV light is provided by at least one UV light source and at a wavelength ranging from about 185 nm to about 254 nm. The wavelength of the second UV light is sufficient to provide a dosage adequate to destroy all of the total organic carbon in the concentrate stream by sizing at a minimum of 90,000 microwatt seconds per square centimeter.

The water purification system is further comprised of a membrane degasification treatment 14 following the second UV light. Degasification is the removal of dissolved gases from liquids, especially water or aqueous solutions. The gas-liquid separation membranes utilized in the present invention allow gas, but not liquid, to pass through, thereby removing all of the gases from the concentrate stream. Flowing a solution inside a gas-liquid separation membrane and vacuating outside makes the dissolved gas go out through the membrane. This method has the advantage of being able to prevent redissolution of the gas, so it is used to produce very pure solvents, such as the highly purified water of the present invention.

The water purification system is further comprised of an electrodeionization treatment after degasification. Electrodeionization is a water treatment process that removes ionizable species from the concentrate stream using electrically active media and an electrical potential to effect ion transport. It differs from other water purification technologies such as conventional ion exchange in that it is does not require the use of chemicals such as acid and caustic. Electrodeionization is commonly used as a polishing process to further deionize reverse osmosis concentrates. The electrically active media in electrodeionization devices function to alternately collect and discharge ionizable species, or to facilitate the transport of ions continuously by ionic or electronic substitution mechanisms. Electrodeionization devices comprise media of permanent or temporary charge, and may be operated batchwise, intermittently, or continuously.

There are two distinct operating regimes for electrodeionization devices: enhanced transfer and electroregeneration. In enhanced transfer, the resins within the device remain in their salt forms. In low conductivity solutions the ion exchange resin is orders of magnitude more conductive than the solution, and act as a medium for transport of ions across the compartments to the surface of the ion exchange membranes. This mode of ion removal is only applicable in devices that allow simultaneous removal of both anions and cations, in order to maintain electroneutrality. In electroregeneration, resins are continuously regenerated by electrically produced hydrogen and hydroxide ions. The dissociation of water preferentially occurs at bipolar interfaces in the ion-depleting compartment where localized conditions of low solute concentrations are most likely to occur. The two primary types of interfaces in electrodeionization devices are resin/resin and resin/membrane. The optimum location for water splitting depends on the configuration of the resin filler. For mixed-bed devices water splitting at both types of interface can result in effective resin regeneration, while in layered bed devices water is dissociated primarily at the resin/membrane interface. "Regenerating" the resins to their H+ and OH− forms allows electrodeionization devices to remove weakly ionized compounds such as carbonic and silicic acids, and to remove weakly ionized organic compounds. This mode of ion removal occurs in all electrodeionization devices that produce ultrapure water, such as the system of the present invention.

The electrodeionization modules 15 have a dilute flow that passes through the resin containing chamber, a concentrate flow that receives the ions leaving the dilute stream, and an electrolyte flow that is the concentrate flow across the surface of the electrodes. The water from the membrane degasification treatment is routed to the dilute inlet on the electrodeionization modules. The concentrate from the first pass of reverse osmosis may be accumulated and utilized for the feed to the concentrate and electrolyte inlets on the electrodeionization modules. The accumulated first pass concentrate is pressurized and injected with acid by chemical injection system 17 prior to entering the elecrodeionization modules.

The water purification system is further comprised of a second UF membrane barrier 19 downstream of electrodeionization. The second UF membrane barrier 19 comprising at least one ultrafiltration membrane, and preferably including a plurality of ultrafiltration membranes. The at least one ultrafiltration membrane is, in some embodiments, a microfilter or an ultrafilter having a nominal pore size to be capable of removing bacteria and organic matter from the feed water. Source water is pumped from to and through the second ultrafiltration membrane barrier and thus to and through the at least one ultrafiltration membrane. The at least one ultrafiltration membrane has a molecular weight cut off of from about 100,000 to about 150,000 and a pore size of about <0.15 microns, thereby only permitting particles smaller than the pore size to pass through the at least one membrane, while those particles that are larger than the pore size, or that have a molecular weight higher than the cut off are prevented from passing through the at least one membrane.

In some embodiments, the water purification system is equipped with a means of injecting acid into the water prior to the water entering the first UV light chamber. This means comprises a chemical injection system 6 and the acid is injected into the water to prevent scaling of the UV light transmitting surface. In further embodiments, the water purification system is equipped with a means of applying an electromagnetic field 7 to the water prior to the water entering the UV light chamber to prevent scaling of the light transmitting surface. This means may be any type that is capable of generating a directed magnetic field such as an electromagnet or a metal magnet. In still further embodiments, the water purification system is equipped with a means of injecting sodium metabisulfite downstream of the first high intensity UV light by way of a chemical injection system 21. In still further embodiments, the water purification system may be equipped with a means of injecting antiscalant downstream of the first UV light by a chemical injection system 21. A person having ordinary skill in the art will appreciate that any suitable chemical injection system may be utilized with the several embodiments of the present invention, including, without limitation, chemical injection pumps, gear pumps, centrifugal pumps, positive displacement pumps, diaphragm pumps, and metering type pumps.

Embodiments of the present invention may comprise any one or more of the novel features described herein, including in the Detailed Description, and/or shown in the drawing. The claims may include one or more features of any one or more of the embodiments described herein. For example, one or more features of one embodiment may be claimed in combination with one or more features of another embodiment, and no portion of this specification limits such claims.

The present invention, in various embodiments, includes components, methods, processes, systems and/or apparatuses substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included descriptions of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A water purification system for producing high purity water comprising:
    (a) a first ultrafiltration membrane barrier, the first ultrafiltration membrane barrier comprising at least one ultrafiltration membrane having a molecular weight cut off of no greater than about 150,000;
    (b) a first high intensity UV light source capable of providing UV light at a wavelength within a range from about 185 nm to about 254 nm;
    (c) a first pass reverse osmosis system;
    (d) a second pass reverse osmosis system;
    (e) a second high intensity UV light source capable of providing UV light at a wavelength within a range of from about 185 nm to about 254 nm;
    (f) a membrane degasification treatment;
    (g) an electrodeionization treatment; and
    (h) a second ultrafiltration membrane barrier, the second ultrafiltration membrane barrier comprising at least one ultrafiltration membrane having a molecular weight cut off of no greater than about 150,000;
    wherein elements (a) through (h) are arranged in order of flow through the water purification system with the first ultrafiltration membrane being upstream of the first high intensity UV light source, the first high intensity UV light source being upstream of the first pass reverse osmosis system, the first pass reverse osmosis system being upstream of the second pass reverse osmosis system, the second pass reverse osmosis system being upstream of the second high intensity UV light source, the second high intensity UV light source being upstream of the membrane degasification, the membrane degasification treatment being upstream of the electrodeionization treatment and the electrodeionization treatment being upstream of the second ultrafiltration membrane barrier; and
    wherein the water purification system is in the absence of a carbon filter.

2. The water purification system of claim 1, further comprising a means of automatically backflushing the first ultrafiltration membrane barrier on a periodic basis.

3. The water purification system of claim 1, further comprising a means of injecting a sodium hypochlorite solution on a continual basis into a source water before the source water is passed through the first ultrafiltration membrane barrier.

4. The water purification system of claim 1, wherein the UV light source is sufficient to provide a UV light dosage to the water adequate to destroy both free chlorine and chloramines by sizing at a minimum of 3 million microwatt seconds per square centimeter.

5. The water purification system of claim 1, wherein a concentrate side of the first pass of reverse osmosis is fluidly connected to a concentrate inlet of the electrodeionization treatment to provide concentrate generated by the first pass of reverse osmosis as feed to the concentrate inlet of the electrodeionization treatment; and
    the water purification system comprises, between the concentrate side of the first pass of reverse osmosis and the concentrate inlet of the electrodeionization treatment, an injection system comprising acid and configured to inject the acid into the concentrate to acidify the concentrate prior to the concentrate inlet of the electrodeionization treatment.

6. The water purification system of claim 1, wherein the second UV light is sufficient to provide a UV light dosage adequate to destroy organic carbon in a permeate stream from the second pass reverse osmosis system by sizing at a minimum of 90,000 microwatt seconds per square centimeter.

7. The water purification system of claim 1, comprising means of injecting acid into the water prior to the water entering the first UV light chamber.

8. The water purification system of claim 1, comprising means of applying an electromagnetic field to the water prior to the water entering the UV light chamber to prevent scaling of the light transmitting surface.

9. The water purification system of claim 1, comprising means of injecting sodium metabisulfite downstream of the first high intensity UV light by way of a chemical injection system and upstream of the first pass reverse osmosis system.

10. The water purification system of claim 1, comprising means of injecting antiscalant downstream of the first UV light by a chemical injection system and upstream of the first pass reverse osmosis system.

11. The water purification system of claim 1, wherein the water purification system is in the absence of a water softener.

12. The water purification system of claim 1, wherein the water purification system is in the absence of a multimedia filter.

13. The water purification system of claim 1, wherein the water purification system is in the absence of a water softener and multimedia filter.

14. The water purification system of claim 13, wherein a concentrate side of the first pass of reverse osmosis is fluidly connected to a concentrate inlet of the electrodeionization treatment to provide concentrate generated by the first pass of reverse osmosis as feed to the concentrate inlet of the electrodeionization treatment; and the water purification system comprises, between the concentrate side of the first pass of reverse osmosis and the concentrate inlet of the electrodeionization treatment, an injection system comprising acid and configured to inject the acid into the concentrate to acidify the concentrate prior to the concentrate inlet of the electrodeionization treatment.

15. The water purification system of claim 14, comprising a chemical injection system between the first ultrafiltration membrane barrier and the first UV light source, the chemical injection system comprising acid and being configured to inject the acid into water after the ultrafiltration membrane barrier and prior to the first UV light source.

16. The water purification system of claim 14, comprising a chemical injection system between the first high intensity UV light source and the first pass of reverse osmosis, the chemical injection system comprising antiscalant and being configured to inject the antiscalant into water after the first high intensity UV light source and prior to the first pass of reverse osmosis.

* * * * *